(12) United States Patent
To

(10) Patent No.: US 12,147,853 B2
(45) Date of Patent: Nov. 19, 2024

(54) METHOD FOR ORGANIZING DATA BY EVENTS, SOFTWARE AND SYSTEM FOR SAME

(71) Applicant: Kenny To Research LLC, Santa Clara, CA (US)

(72) Inventor: Kenny To, Santa Clara, CA (US)

(73) Assignee: Kenny To Research LLC, Santa Clara, CA (US)

( * ) Notice: Subject to any disclaimer, the term of this patent is extended or adjusted under 35 U.S.C. 154(b) by 0 days.

(21) Appl. No.: 17/891,663

(22) Filed: Aug. 19, 2022

(65) Prior Publication Data

US 2023/0055003 A1    Feb. 23, 2023

Related U.S. Application Data

(60) Provisional application No. 63/235,597, filed on Aug. 20, 2021.

(51) Int. Cl.
*G06F 9/54* (2006.01)
*G06F 16/11* (2019.01)

(52) U.S. Cl.
CPC .............. *G06F 9/542* (2013.01); *G06F 9/546* (2013.01); *G06F 16/11* (2019.01)

(58) Field of Classification Search
None
See application file for complete search history.

(56) References Cited

U.S. PATENT DOCUMENTS

| | | | |
|---|---|---|---|
| 10,324,942 B2 | 6/2019 | Yang et al. | |
| 10,715,570 B1 * | 7/2020 | Feinstein | H04L 65/61 |
| 11,422,871 B1 * | 8/2022 | Mounirou | G06F 16/113 |
| 2007/0115917 A1 | 5/2007 | Miller et al. | |
| 2007/0244571 A1 * | 10/2007 | Wilson | G05B 19/042 707/E17.005 |
| 2010/0299678 A1 * | 11/2010 | Taylor | G06F 9/542 719/318 |
| 2013/0067288 A1 * | 3/2013 | Louie | G06F 11/1471 709/224 |
| 2015/0161214 A1 * | 6/2015 | Kali | G06F 16/24558 707/758 |
| 2019/0163603 A1 * | 5/2019 | Brown | H04L 41/069 |

(Continued)

FOREIGN PATENT DOCUMENTS

| | | | |
|---|---|---|---|
| WO | WO-2017190058 A1 | 11/2017 | |
| WO | WO-2018215062 A1 * | 11/2018 | G06F 16/24568 |

OTHER PUBLICATIONS

International Search Report for Application No. PCT/US22/40907, mailed on Feb. 3, 2023, 4 pages.

(Continued)

*Primary Examiner* — Charles E Anya
(74) *Attorney, Agent, or Firm* — Intellectual Innnovations Legal Advisors

(57) ABSTRACT

A method for organizing data by events, comprising separating events of a first type from a series of data messages from a data source and organizing the events of the first type into a first series of event data and separating events of second type from the series of messages and organizing the events of the second type into a second series of event data. A method for determining the state of a data source and a method for managing event data from a data source are additionally provided.

12 Claims, 10 Drawing Sheets

(56) References Cited

U.S. PATENT DOCUMENTS

2019/0195637 A1 6/2019 Brennan et al.
2020/0097195 A1* 3/2020 Fritz ................... G06F 3/0647

OTHER PUBLICATIONS

Response to Written Opinion for Application No. PCT/US2022/40907, mailed on Jun. 20, 2023, 8 pages.
Written Opinion for Application No. PCT/US22/40907, mailed on Feb. 3, 2023, 5 pages.
Clickhouse, Yandex Opensources ClickHouse, retrieved from internet [URL:https://clickhouse.com/blog/yandex-opensources-clickhouse], Jun. 2016, 3 pages.
Dageville B., et al., "The Snowflake Elastic Data Warehouse," Proceedings of the International Conference on Management of Data, 2016, pp. 215-226.
Data Warehousing on AWS: AWS Whitepaper, Jan. 2021, 27 pages.
Fowler M., "Command Query Responsibility Segregation," retrieved from internet [URL:https://martinfowler.com/bliki/CQRS.html], Jul. 2011, 5 pages.
Fowler M., Event Sourcing, retrieved from internet [URL:https://martinfowler.com/eaaDev/EventSourcing.html], Dec. 2005, 23 pages.
Freeman L., "What's Old is New Again- Storage Tiering," Apr. 2012, 23 pages.
Im J.F., et al., "Pinot: Realtime OLAP for 530 Million Users," Proceedings of the International Conference on Management of Data SIGMOD, Jun. 2018, pp. 583-594.
Jay Kreps, Questioning the Lambda Architecture, Jul. 2014, 9 pages.
Kreps J., "The Log: What Every Software Engineer Should know about Real-time Data's Unifying Abstraction," Dec. 2013, 29 pages.
Nathan Marz, How to Beat the CAP Theorem, Thoughts from the Red Planet, Oct. 2011, retrieved from internet [URL:http://nathanmarz.com/blog/how-to-beat-the-cap-theorem], 29 pages.
Yang F., et al., "Druid: A Real-time Analytical Data Store," Proceedings of the ACM SIGMOD International Conference on Management of Data, Jun. 2014, pp. 157-168.

* cited by examiner

| Source Type | Event Series | Resulting State |
|---|---|---|
| Microcontrollers with sensors | • rotated 1 unit along X axis<br>• rotated 2 units along Y axis<br>• rotated 3 units along Z axis<br>• rotated 4 units along X axis | orientation is (5, 2, 3) |
| Embedded microcomputers | • moved one step west<br>• moved one step north<br>• raised robot arm | robot is ready to interact with asset at coordinates (1, 1) |
| Wearable technology | • user heart beat at 0.5 seconds<br>• user heart beat at 1.0 seconds<br>• user heart beat at 1.5 seconds<br>• user heart beat at 2.0 seconds | user heart rate is 120 beats per minute |
| Smartphones / tablets | • GPS indicates coordinates (0, 0)<br>• GPS indicates coordinates (0, 1)<br>• GPS indicates coordinates (0, 2)<br>• GPS indicates coordinates (0, 3) | user is traveling north |
| Personal computers | • user logged in<br>• user opened app A<br>• user opened app B<br>• user closed app A | user is using app B |
| Server applications | • deposited $1000<br>• deposited $500<br>• withdrew $250 | balance is $1250 |

FIG. 5

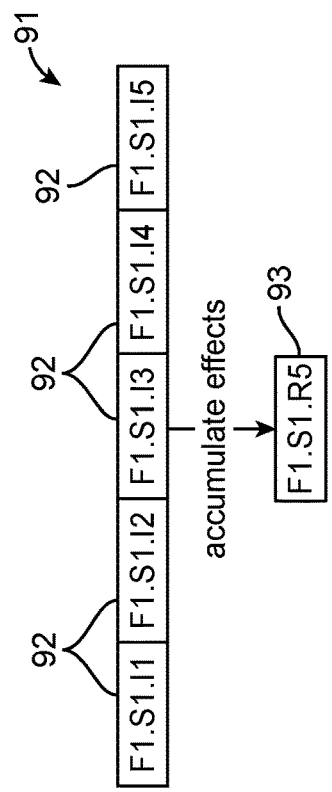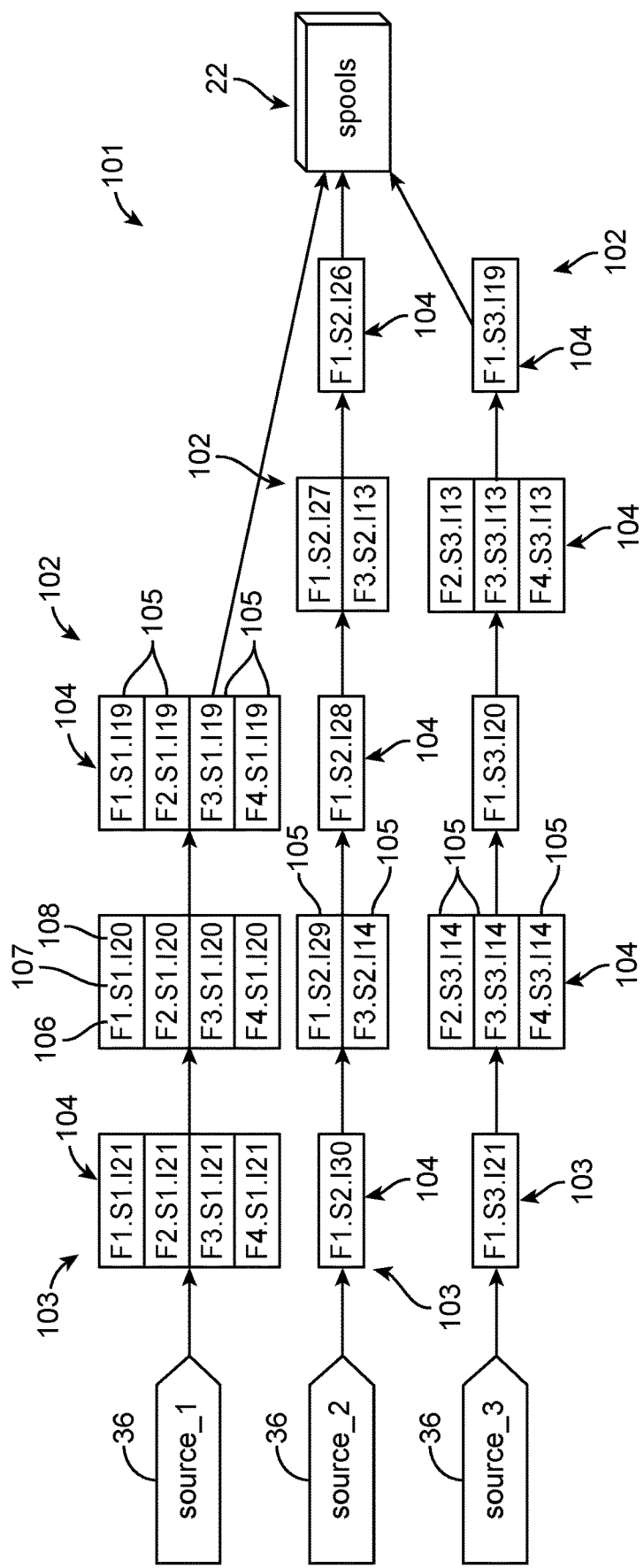
FIG. 6
FIG. 7

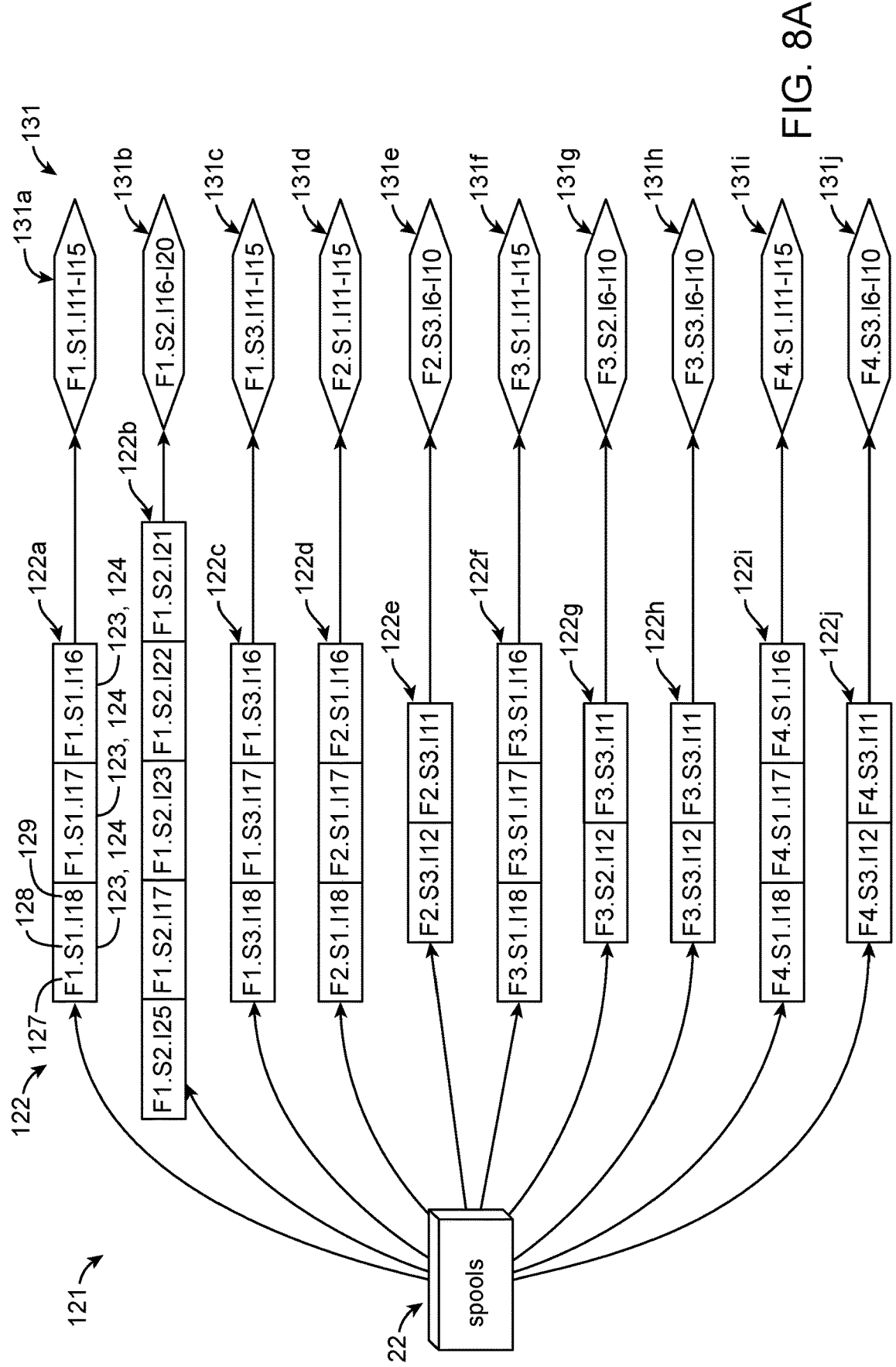

METHOD FOR ORGANIZING DATA BY EVENTS, SOFTWARE AND SYSTEM FOR SAME

CROSS REFERENCE TO RELATED APPLICATION

This application claims priority to U.S. provisional patent application Ser. No. 63/235,597 filed Aug. 20, 2021, the entire content of which is incorporated herein by this reference.

FIELD OF THE INVENTION

This invention relates generally to data warehouses, and more particularly to data warehouse for storing data from a plurality of event sources.

BACKGROUND OF THE INVENTION

A traditional data warehouse typically represents its data as tables, having columns and rows, and records from multiple sources often commingled together.

Event sourcing and Command Query Responsibility Segregation (CQRS) are advanced software techniques (sometimes known as Lambda Architecture or Kappa Architecture) for supporting dramatically enhanced analytics, auditing, transformation, and other types of data processing. Event sourcing and CQRS can be particularly useful for Internet of Things (IoT) or similar applications, for example data with respect to the state of the IoT or other device. However, it is often not practical for software organizations to adopt such software techniques because their utilization can involve significantly more work and be accompanied by bigger challenges than traditional architectures for managing the state of an object, which can be referred to as a state, and there are relatively few software engineers trained in such advanced software techniques.

State can be defined as data that is current and relevant for a given application pertaining to the device. For IoT and certain other devices, events that contribute to the state of the device can optionally include its power status, its location, its acceleration or velocity, its management status, the environment in which the device was deployed to monitor or any combination of the foregoing. The environment can optionally include events such as temperature, pressure, sound, light, motion or any combination of the foregoing. The state of a device can be determined by the then aggregate of all events pertaining to the device. For traditional server or datacenter applications, state is often synonymous with a database tracking users and accounts, digital assets, financial assets, orders, other financial information, or any combination of the foregoing. The values stored in such a database would typically be the current, that is most recent, values of that information and mutate, that is change in place, as the information is updated. State can also involve the state of a device and the state of a related server or data center. For example with respect to applications involving smartphones, wearable devices and mobile devices, state can involve what the user is currently doing. Since state is "current", it's susceptible to changing, in order words it is mutable.

Many real world applications involve the state of an object for use in online transactional processing (OLTP), for example to support day-to-day business operations, and subsequently in online analytical processing (OLAP), for example to support business intelligence. Traditional software architectures represent the state of an object using mutable data stores, for example relational database management systems (RDBMS), for OLTP and later use complicated and expensive extract, transform, load (ETL) or sometimes extract, load, transform (ELT) processes to generate immutable views in a data warehouse that are more suitable for OLAP. Organizations using these traditional architectures can sometimes perform doing OLTP well, but face limitations and challenges when performing OLAP. It is often difficult to overcome these OLAP issues without rearchitecting the entire application.

There is a need for new software components, tools, and frameworks to overcome the foregoing challenges and obstacles, including the significant skills gap.

BRIEF DESCRIPTION OF THE DRAWINGS

The drawings described herein are for illustration purposes only and are not intended to limit the scope of the present disclosure in any way.

FIG. 5 is a table of sample data sources and related event series and resulting states from a sample operation the event warehouse or system of the invention.

FIG. 6 is a schematic illustration of a sample event series and resulting state from a sample operation of the event warehouse or system of the invention.

FIG. 7 is a schematic illustration of a sample parsing step of the event warehouse or system of the invention.

FIG. 8A is a portion of a schematic illustration of event series of the invention coming off one or more spools.

DETAILED DESCRIPTION OF THE INVENTION

This invention introduces the new concept of an event warehouse which, along with associated tools and frameworks, can help make event sourcing and CQRS practical for many mainstream software organizations. An event warehouse of the invention can optionally be defined as a data warehouse oriented around collections of immutable series of events, or event logs, as its primary primitive. The event warehouse of the invention can also be referred to as a system. In contrast to a traditional data warehouse, an event warehouse or system of the invention can represent its data as immutable series of events where each data source provides its own series of events.

Event sourcing can optionally be defined here as an architecture with a philosophy that states are the result of all the history of a given device, user, application or any combination of the foregoing up to a given time. Each individual entry in the history can be referred to as an event. The event sourcing of the invention can optionally involve capturing that history. Events can be referred to as immutable, as history does not change. For example, IoT and other devices can have a plurality of associated events, for example power change, accelerometer movement and temperature change. Event sourcing of the invention can "replay" some or all of the events associated with an IoT or other device to determine the resulting state of the IoT or other device. For example, the event sourcing of the invention can replay all of the power events, all of the location events, all of the temperature events or any combination of the foregoing to determine a state of the IoT or other device at a point in time. Such a history is immutable, that is new events are appended but old events never change once they have been stored. The state at any point in time can optionally be computed by repeatedly applying a transition function to the historical events leading up to that time. Server applications of the invention can consider each database transaction, such as transferring money from one account of a person or entity to another, as an event, and event sourcing can replay all those money transferring events to determine the account balance of the person or entity at any point in time.

Figure 1:
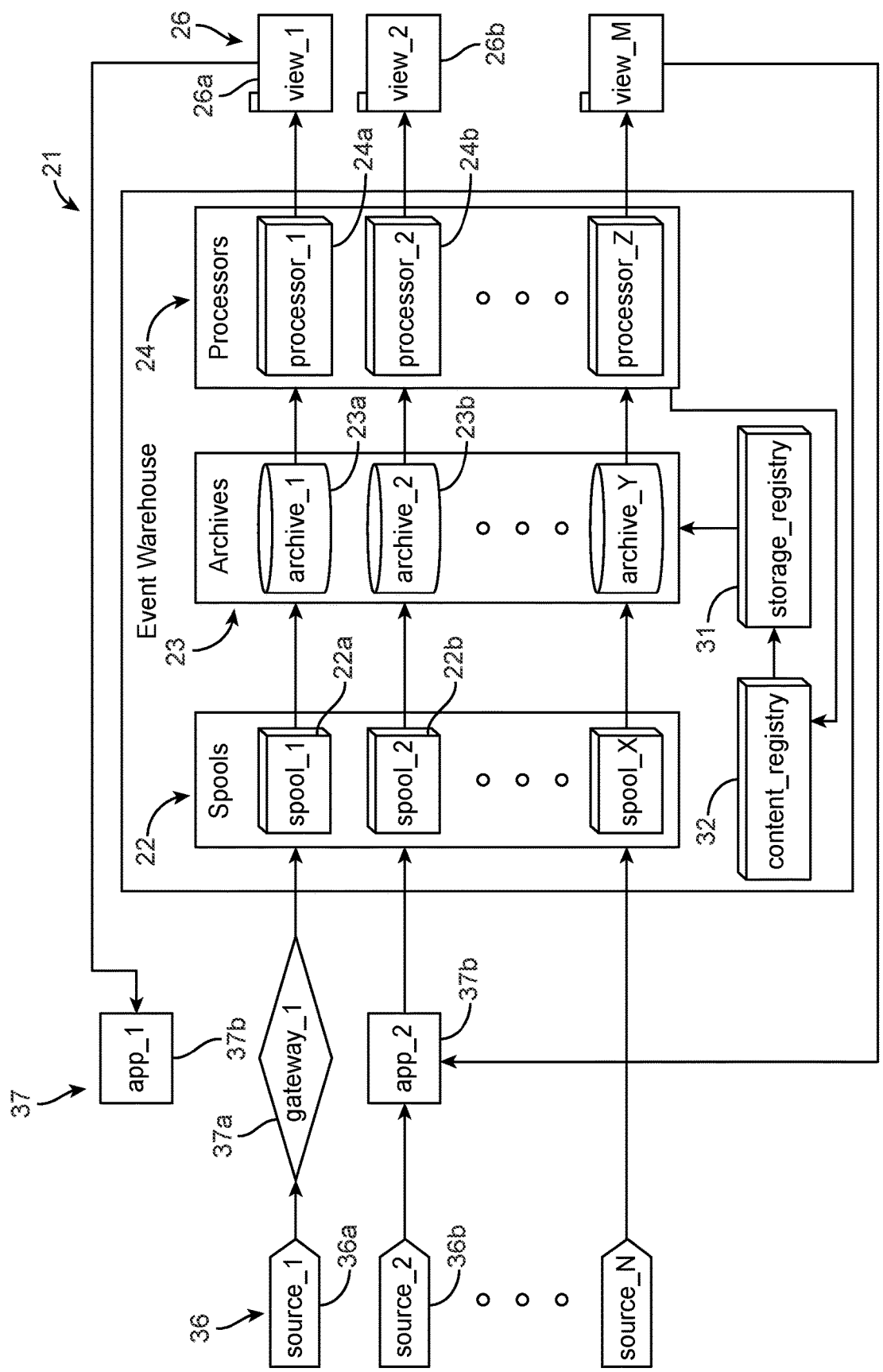
FIG. 1 is a schematic illustration of an embodiment of components of an event warehouse or system of the invention.

The hardware components of the event warehouse or system of the invention can be of any suitable type. One suitable configuration of the event warehouse or system 21 of the invention is illustrated in FIG. 1. The components of event warehouse or system 21 therein can include one or more spools 22, for example spools 1-X, one or more archives 23, for example archives 1-Y, and one or more processors 24, for example processors 1-Z. The product of system 21 can include one or more views 26, for example views 1-M, presented for example any suitable application programming interface (API). The spools 22 can include first spool 22a and second spool 22b. The archives 23, which can also be referred to as storage 23, include first archive or storage 23a and second archive or storage 23b. The processors 24 can include first processor 24a and second processor 24b. The views 26 can include first view 26a and second view 26b.

The spools 22 can be referred to as temporary staging areas for incoming data, which data can be transformed by the spools into a long term archival format for storage in archives 23. Archives or storage 23 can be one or more collections of commodity storage. The transformed data stored in archives 23 can optionally be organized by metadata in storage registry 31 and content registry 32. The processors 24 can each be any suitable compute resource or processor, for example a compute resource or processor that can discover relevant events in archives or storage 23 from the registries 31,32, read the event data from storage 23, and process it into the desired views 26, for example for applications. The components of system can be located in one or more computing devices, or virtual portions of one or more computing devices, for example one or more servers or virtual portions thereof in the cloud.

Customers, end users, or partners of the event warehouse or system 21 can utilize the system with one or more data sources 36, for example data sources 1-N. The data sources 36 can include first data source 36a and second data source 36b. Each data source 36 can be of any suitable type, for example microcontrollers with sensors, embedded microcomputers, wearable technology, smartphones, tablets, personal computers, server applications and any combination of the foregoing. These data sources each send data, potentially through optional middleware 37 such as a suitable gateway 37a or a suitable application instance 37b such as an application instance server, into system 21. The event warehouse or system 21 can store all of the data in a long term archival format, for example in archives 23, and present one or more views 26 of the data suitable for various applications, for example analytics, auditing or both.

Within the event warehouse or system 21, data can be stated to go through three phases: spooling, long term storage and processing transformations into views. Sources 36, application instances 37b, gateways 37a, spools 22, archives 23, processors 24, and views 26 may each scale in number independently of each other. For example, in another use of system 21, 100,000 sources 36 may upload data to 100 spools 22 while processors 24 scale up and down on demand, for example perhaps ten processors 24 for base load maintenance of compacted data but bursting to more, for example 1,000, processors 24 when the customer wishes to generate some computationally expensive views 26.

Figure 2:
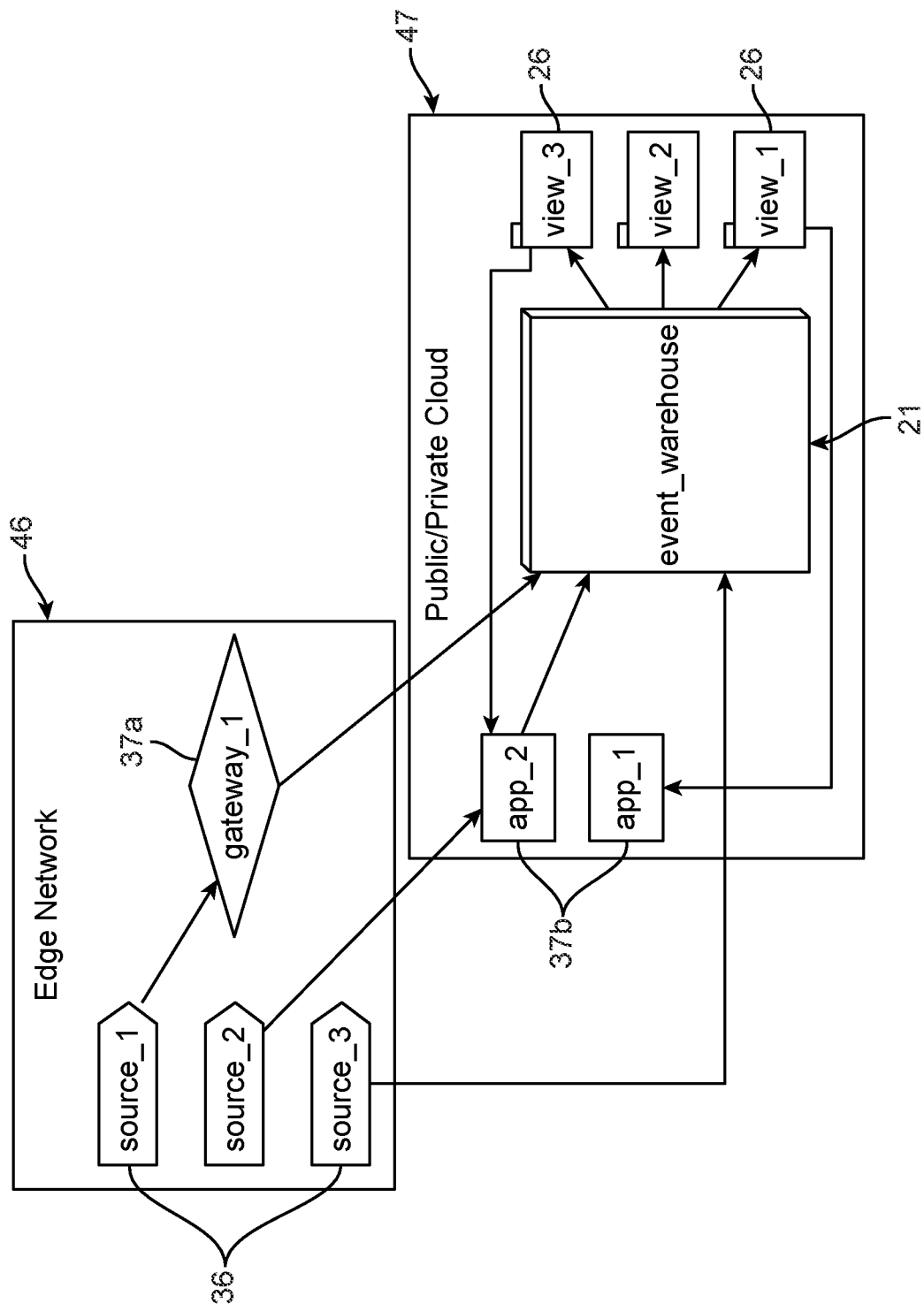
FIG. 2 is a schematic illustration of an embodiment of an event warehouse or system of the invention where the data sources are in a different network from the network in which the event warehouse or system is located.

The event warehouse or system of the invention can be consumed or provided as a Platform as a Service (PaaS) hosted on any suitable compute infrastructure, which compute infrastructure can be referred to as a storage system, for example a public cloud, a private cloud or on-premises system or a combination of the foregoing (see FIG. 2). Examples of suitable public clouds include Amazon Web Services, Microsoft Azure and Google Cloud Platform). Examples of suitable private clouds or on-premises systems include VMware, OpenStack, CloudStack and Kubernetes. Any such compute infrastructure, or storage system, can include for example storage, compute resources and networking. For example, such compute infrastructure can host the application servers of system 21, with archival storage 23, processors 24 and any suitable networking capabilities or devices (not shown) for permitting communication with data sources 36 on a different network. For example, the data sources 36 can optionally be edge devices on a different edge network, for example as shown in FIG. 2 where edge network 46 is separate from cloud network 47. Edge network 46 is shown as including a plurality of three data sources 36 and cloud network, which as discussed above can optionally be a public cloud or private cloud, is shown as including event warehouse or system 21. Network latency, throughput, availability, and power consumption considerations may require the data sources 36, which can optionally be referred to as end devices, to send their data through a middleware component 37, such as a suitable gateway 37a or a suitable application instance 37b. The middleware 37 can optionally be part of the edge network 46, as shown with gateway 37a in FIG. 2, or part of the cloud network 47, as shown with first and second application instances 37b in FIG. 2.

Figure 3:
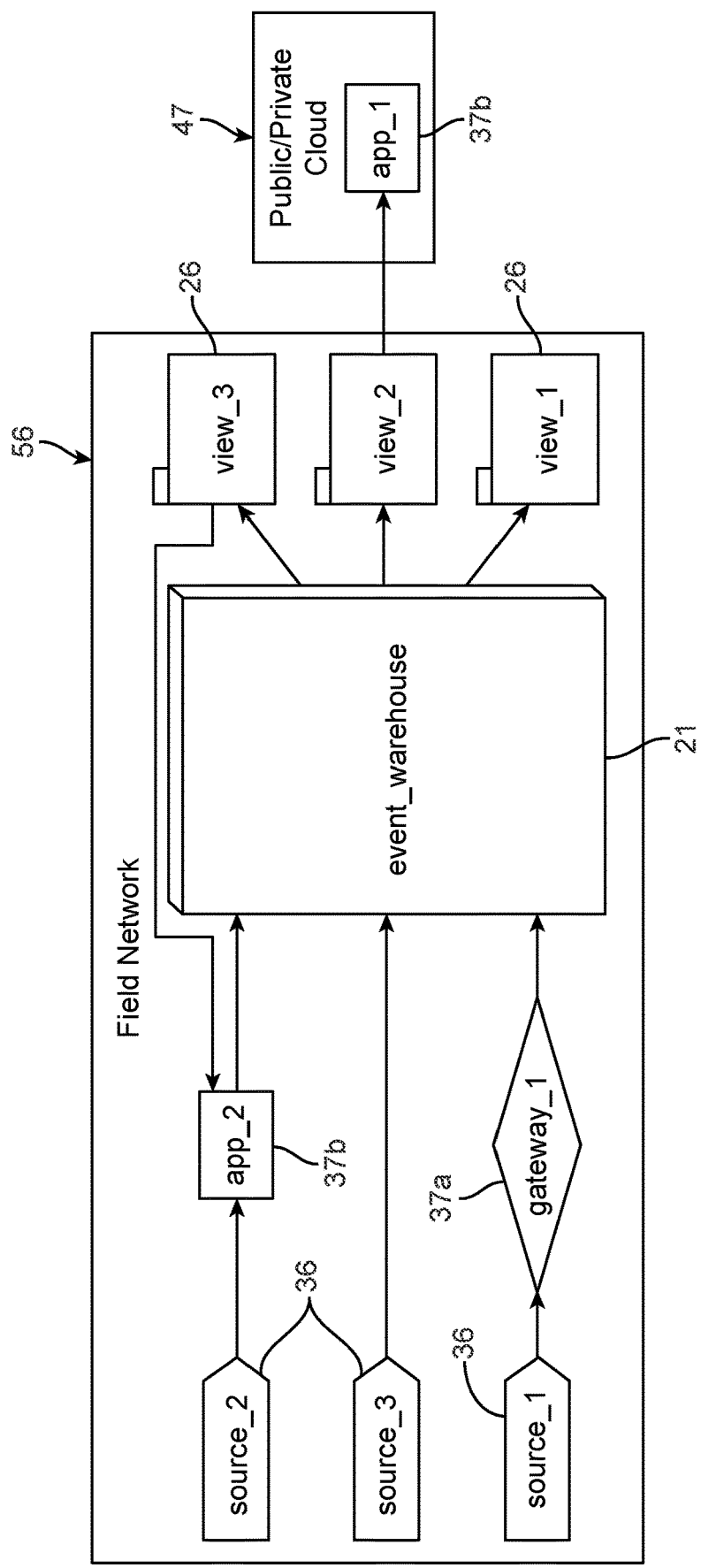
FIG. 3 is a schematic illustration of an embodiment of an event warehouse or system of the invention where the data sources and the event warehouse or system are in the same network.

In some cases, it can be desirable for the application servers of the event warehouse of the invention to exist on the same edge network, which can optionally be referred to as a field or remote network, where the data sources exist (see FIG. 3). This may be due, for example, to security concerns about the sensitive data being sent to and stored in the event warehouse. Network latency, throughput, availability, and power consumption can also be a factor for providing the data sources and the event warehouse on the same network. The event warehouse can be capable of being deployed in such a remote or field office with sufficient general purpose compute power. An example of a field or remote network 56 that includes data sources 36 and system 21 is shown in FIG. 3. The outputs of system 21 can be received in a different network by any suitable means. For example as shown in FIG. 3, views 26 can be received in any suitable cloud network 57*o*, for example with the assistance of suitable middleware 37 such as a suitable application instance 37*b*. As discussed above, the cloud network can optionally be a public cloud network or a private or on-premises cloud network.

Figure 4:
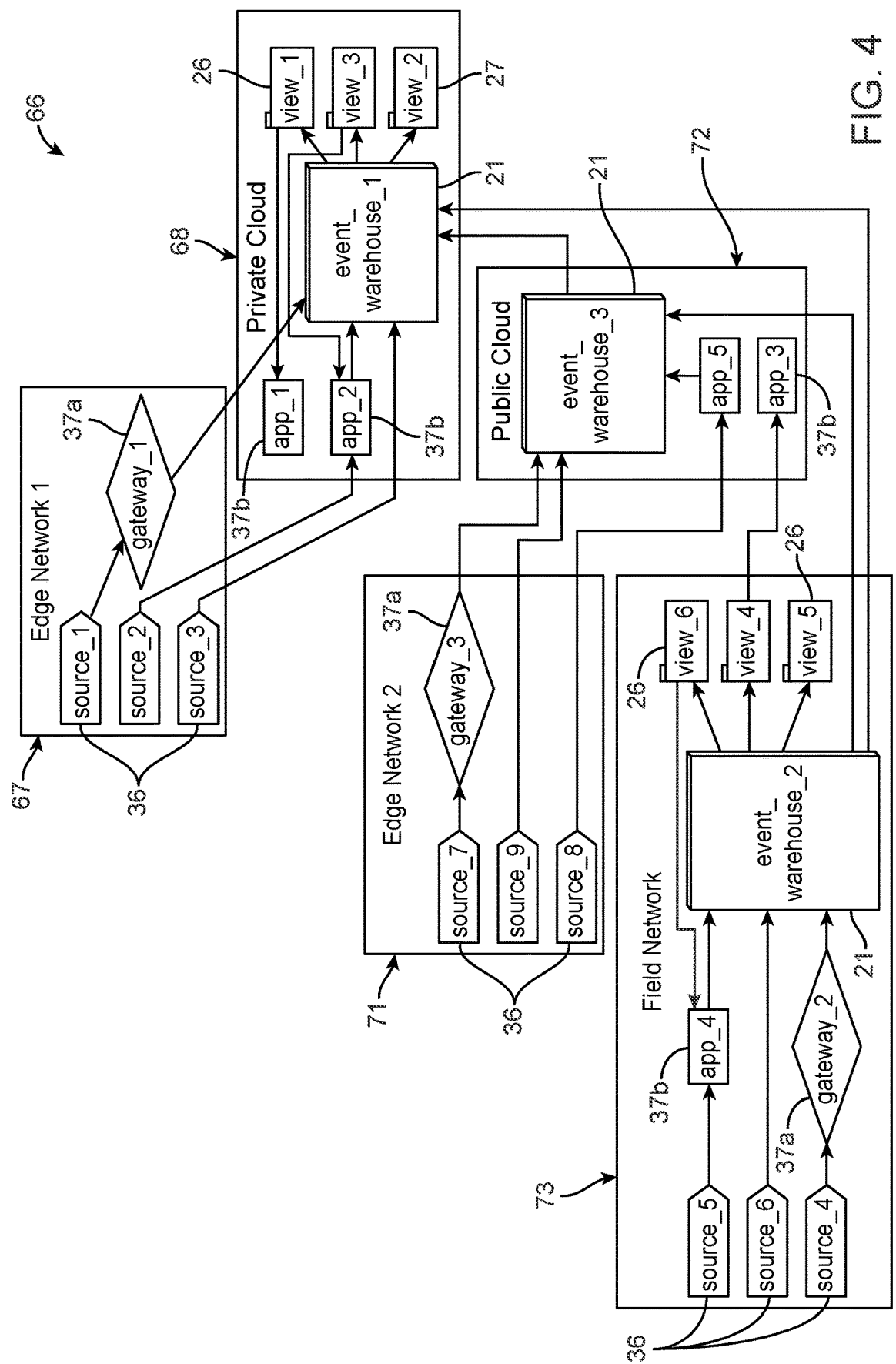
FIG. 4 is a schematic illustration of an embodiment of a decentralized deployment of a multiple event warehouses or systems of the invention.

Large enterprise deployments may require multiple event warehouses or systems of the invention, mixing and matching the various deployment types disclosed above to meet their needs, for example with regards to scale, security, organization and networking constraints (see FIG. 4). In deployments with multiple event warehouses or systems, each event warehouse or system can optionally be capable of replicating or synchronizing its data with other event warehouses or systems to make the same data available at other sites that wish to consume it in an application view. Multiple event warehouses cooperating in the foregoing can optionally be referred to as a federated or decentralized deployment. In the example of FIG. 4, decentralized deployment 66 includes a first edge network 67 that provides input data from three data sources 36 to a private cloud network 68 containing a first system 21 and outputting one or more views 26. A suitable gateway 37*a* in the first edge network 67 and a suitable application instance 37*b* in the cloud network 68 are optionally utilized for providing the input data from certain of sources 36 in network 67 to system 21 in network 68. A suitable application instance 37*b* can optionally be coupled to a view 26 in the private cloud network 68 for permitting access to the view. A second edge network 71 provides input data from three data sources 36 to a public cloud network 72 containing a second system 21, which communicates with the first system 21 of private cloud network 68, for example for replicating or synchronizing the data of the two systems 21. The second edge network 71 utilizes a gateway 37*a* and the public cloud network 72 utilizes a suitable application instance 37*b* for providing input data from respective data sources 36 of the second edge network 71 to the second system 21 of the public cloud network 72. The decentralized deployment 66 includes a field network 73, which can optionally be identical to field network 56 and include a third system 21, which communicates with the first system 21 of private cloud network 68 and the second system of 21 of public cloud network 72, for example for replicating or synchronizing the data between the three systems 21. A suitable application instance 37*b* can optionally be provided in cloud network 72 and coupled to a view 26 in the field network 68 for permitting access to the view in the cloud network.

The event warehouse of the invention may desire to minimize the amount of data that needs to be retrieved from storage, for example archives 23, and processed with compute resources, for example processors 24, to transform it into a particular view, for example a view 26. IoT applications using an event warehouse or system 21 may require a particularly challenging type of processing, for example accumulating the effects of all events in a series or a range of events in a series to determine the resulting state of the entity, for example data source or IoT device 36, that generated those events. The event warehouse or system 21 can make this type of processing efficient by considering all of the series of events from the source 36 to be separate from each other, for example no commingling between series, and optionally storing each such separate series of events in a compact archival format that can be quickly retrieved and processed.

Instead of directly storing states as a traditional data warehouse might represent in tables, an event warehouse or system of the invention considers states to be results that can be computed from the data stored as event series. Table 81 in FIG. 5 lists several sample sources 36 and related event series 82 and resulting states 83. Sources or devices 36 include a microcontroller, an embedded microcomputer, wearable technology, a smartphone or tablet, a personal computer and server applications, for example related to financial matters. Each event series 82 includes a plurality of separate events 84, for example four rotation steps or events 84 with respect to the microcontroller, and value for each event 84. The relative position of the event 84 in the event series 82 can optionally be considered the event index The resulting state 83 for each device 36 is the state of the device after aggregating each step or event in the event the corresponding event series 82 of the device 36.

An example of an event series and the resulting state produced by the event warehouse or system of the invention can include event series 91 illustrated in FIG. 6. Event series 91 includes a plurality of five events 92, each event including a field F1 serving as an event type identifier, a source identifier 51 and a value I1 to I5 for the event. The relative position of the event 92 in the series 91 can optionally be considered the event index The resulting state of the five events 92 in event series 91 is resulting state 93, which can optionally include the event type identifier, the source identifier and a state or resulting value R5, that is the result of the source or microcontroller 36 after five events 92. Examples of an event type identifier include, for example with reference to table 81 of FIG. 5, the rotation of the microcontroller 36 in row one of the table. Examples of a source identifier include, for example with reference to table 81, the microcontroller in row one of the table. Examples of values with reference to the event series 82 pertaining to the microcontroller in row one of table 81 of FIG. 5, the first rotation along X axis would have an event index of one and a value of 1, corresponding to the 1 unit, the rotation along the Y axis would have an event index of two and a value of 2, the rotation along the Z axis would have an event index of three and a value of 3 and the last rotation along the X axis would have an event index of four and a value of 4 units. Examples of resulting state with reference to the event series 82 pertaining to the microcontroller in row one of table 81 of FIG. 5 would be the orientation of (5,2,3).

The system of the invention can compute the resulting state, for example resulting state 83 or 93, from the beginning of an event series, for example event series 82 or 91, up to any event, for example an event 84 or 92, in that series by repeatedly applying a transition function from any suitable mathematical model of that state machine. Popular models include Mealy machines and Moore machines. For example, a Mealy machine includes a transition function T where computing T(previous_state, event) yields a current state. An example of a Mealy machine calculation in an event series representing field 1 of source 1, where F1.S1.R0 represents the initial state before any events have been recorded, is as follows:

After the event F1.S1.I1, that is the first event, the new state F1.S1.R1 can be computed as T(F1.S1.R0, F1.S1.I1)

After the event F1.S1.I2, the second event, the new state F1.S1.R2 can be computed as T(F1.S1.R1, F1.S1.I2) which expands to T(T(F1.S1.R0, F1.S1.I1), F1.S1.I2)

After the event F1.S1.I5, that is the fifth event, the new state F1.S1.R5 can be computed as T(F1.S1.R4, F1.S1.I5) which expands to T(T(T(T(T(F1.S1.R0, F1.S1.I1), F1.S1.I2), F1.S1.I3), F1.S1.I4), F1.S1.I5)

Note that these expansions only require T, F1.S1.R0, F1.S1.I1, F1.S1.I2, . . . , F1.S1.R5 can be but not the resulting state or value F1.S1.R1, F1.S1.R2, . . . , F1.S1.RN. Accordingly, the resulting state or value need not optionally be stored. However, the system of the invention may choose to cache the result values as part of a memoization strategy, which involves storing them in cache storage An application of the foregoing Mealy example where the source 36 is an account, the field is the account value, the account balance is the state and each transaction is an event, is as follows:

The transition function T(previous_balance, transaction_amount) defines current_balance to be previous_balance+transaction_amount The initial state F1.S1.R0 is 0, representing an empty account After the first event F1.S1I1 of depositing 1000 units of currency, the resulting state F1.S1.R1 includes a state value of 0+1000=1000

After the second event F1.S1.I2 of depositing 500 units of currency, the resulting state F1.S1.R2 includes a state value of 1000+500=1500

After the third event F1.S1.I3 of withdrawing 250 units of currency, the resulting state F1.S1.R3 includes a state value of 1500+−250=1250

The foregoing computations of a state are inherently serial as the computations of a state depends on all previous events in the series. Calculating and storing each state could be prohibitively slow, expensive to compute or both. However, storing each field and source combination as a separate event series to be spooled and formatted appropriately for leveraging tiered storage can minimize overall cost while providing sufficient performance for computing these results. When results from multiple series are desired, they can all be computed in parallel.

An explanation of a computer implementation of the software of the event warehouse or system of the invention is as follows. Sample steps include optionally, writing the input data in the same form as it was received from the source 36 to a buffer (not shown) for potentially delayed handling. In this regard, it may be necessary or desirable to buffer incoming data if the volume of incoming data is too much for the system 21 to immediately process. The software of the invention may buffer the data in any suitable storage system, such as for example Apache Kafka, then perform further handling at a later time.

In an optional step, the software of the invention may parse the incoming data from the one or more sources 36 to identify the fields that values in the data represent, the data source identifier and an event identifier with respect to each field. The parsed information may optionally be called event information or event metadata. Examples of an event identifier include a timestamp, a transaction identifier, sequence number, values specific to the application of the source or device 36 or any combination of the foregoing. Examples of a data source identifier include the serial number of an IoT or other device and a transaction identifier. The software of system 21 is likely to receive data from sources 36 in many different formats due to heterogeneous data sources, for example different hardware, different firmware or software revisions, different applications or any combination of the foregoing. Lower level serialization formats include, but are not limited to, JSON, XML and YAML and may have been carried over transport formats that include, but are not limited to HTTP, MQTT, AMQP and CoAP. Higher level semantic formats may be very application-dependent and may include field names like "timestamp", "state", "value", "temperature" or "name." The software can use one or more techniques of any suitable type for parsing these application-dependent schemas to extract desired information, for example field identifiers, data source identifiers and event identifiers, from the received data. Multiple such techniques can coexist in system 21 to support parsing multiple data types. The parsing step can optionally be performed by one or more processors 24 of system 21, and optionally occurs at the spools 22 for determining which spool a given piece of data should be enqueued.

An illustration of a sample parsing step of system 21 is shown in diagram 101 in FIG. 7. The diagram 101 shows the output or source message 102 from each of a plurality of three data sources 36 over whatever transport protocol used by the source. Each source message 102 includes a message series 103 consisting or a plurality of messages 104. The source message 102 from the first data source 36 has a message series 103 of three messages 104, and each of the source messages from the second data source 36 and the third data source 36 has a message series 103 of five messages 104. Each message 104 includes one or more fields 105, each field having a field identifier 106, a source identifier 107 and an event identifier 108. The field identifier 106 of a field 105 for each source 36 optionally identifies a specific event type of the source, the source identifier 107 optionally identifies the specific source 36 and the event identifier 108 sets forth the primary data, for example value, of the event associated with the message 104. Field identifier 106 can optionally be referred to as an event type identifier. Each corresponding field 105 in a message series 103 corresponds to a specific type of event of the data source 36. In the case where the data source 36 is a device, the event identifier 108 can also be referred to as an event index.

In this example of diagram 101, each of the three messages 104 in the message series 103 from the first source 36 includes a value for each of the four fields 105 in the message. Each of the four fields corresponds to an event of the source. In this regard, the first message 103 in the sequential series 103 of messages 104 from the first source 36, called source_1 in the diagram, has a value in the area of the field labeled with the event identifier 119 in each of the four fields 105, the second message has a value in the area of the field labeled with the event identifier 120 in each field 105 and the third message has a value in the area of the field labeled with the event identifier 121 in each field. Each of the five messages 104 in the message series 103 from the second source 36, called source_1 in the diagram, includes a field 1 with a value and two of the messages in the message series from the second source include field 3 with a value, which is in the portion of the field labeled with the event identifier 114 in the second message and labeled with the event identifier 113 in the fourth message. Three of the messages 104 from the third source 36 include field 1 with a value and the other two messages 104 from the third source 36 include fields 2, 3 and 4 with respective values. The parsing step of the invention normalizes these differences in source messages 102, for example the differing number of messages 104 per source 36 and the differing number of fields 105 per message 102, so that the spooling step of the invention can focus exclusively on individual fields 105 and sources 36 irrespective of the original message format of the sources. The series 103 of messages 104 is stored in its full form, which is easiest to manipulate, as it enters the spools 22.

Multiple techniques can coexist in system 21 to support parsing multiple data types from the respective sources 36. For application schemas that are recognized by the software of the invention, for example application instances 37b in middleware 37, the software of system 21 can optionally have built-in parsers for those schemas. These parsers, which are typically manually written by software developers, can be considered first-party parsers.

Many schemas of application instances 37b may not be immediately recognized by the software of the invention because they may have been designed after the software of the invention was implemented. A third party user or administrator of the software of the invention or the event warehouse or system of the invention can provide parsers that they have written as plugins. Such plugins may be of any suitable form, and for example may take the form of code executed directly by the software of the invention in the same context, code executed remotely by such software in a different context, for example as webhooks, or code executed by a workflow independent of such software, for example as middleware on gateways. The foregoing parsers can all be considered third-party parsers.

Some low level serialization and transport formats provide metadata that can serve as hints for automatic schema detection of the source messages 102 from a source 36. For example, some names of fields 105 in a message 104 are represented as JSON/YAML keys, XML tags, or HTTP headers. The software of system 21 can be configured to automatically generate field identifiers 106 based on the names of the fields 105. To avoid field identifier collisions, the software can optionally incorporate some form of application identifier in the generated field identifier 106. A suitable application identifier can often be found elsewhere in the context of the incoming data format, for example a base URI in an HTTP message.

Once parsed, the software of the invention can spool individual events, for example individual events in each message 104 in a message series 103 from one or more sources 36. Each spooled event can include any suitable information, for example the following data or any combination thereof:

Field identifier
    Data source identifier
    Event index
    Value

In a sample financial application of the foregoing, the field identifier could optionally be a transaction amount, the data source identifier optionally be an account number, the event index optionally be the first event and the value optionally be +1000, which for example is the primary data of the first event in this financial application.

The software can optionally consider the field identifier and the data source identifier together to be an event series identifier, and can optionally accumulate event indexes and values into one spool per event series identifier. Accordingly, each spool for an event series can optionally look like:

Event series identifier=(Field identifier, Data source identifier)

- Values =
  - Event index 1 = Value 1
  - Event index 2 = Value 2
  - Event index 3 = Value 3
  - ...
  - Event index $N$ = Value $N$ All of the spools corresponding to a message series, for example message series 103, can optionally be in a flat collection:

- Spools =
  - Event series 1 = Spool 1
  - Event series 2 = Spool 2
  - Event series 3 = Spool 3
  - ...
  - Event series $N$ = Spool $N$ In an optional step of the software of the invention, the data values for each event from a data source, for example in a field 105 of a message 104, and corresponding event indexes from such a series of events, for example with respect to the same field 105 in a series of messages 104, can optionally be separated from the message series of the source, for example message series 103, and written into one or more spools, for example a separate spool for each series of events. Such separating step can optionally be referred to as a spooling step or phase. Each event in such a series of events can optionally include an event series identifier that can optionally include the field identifier, for example field identifier 106, and the data source identifier, for example source identifier 107, from the data source message, for example message 104, that includes such event. Such separating and writing step can optionally be performed by one or more processors 24 of system 21. Although diagram 101 shows the source messages 102 from the three sources 36 being sent to one spool 22, it is appreciated, for example as discussed above with respect to FIG. 1, that the source message 102 from each source 36 may be sent to a respective spool 22 or any number of spools 22. Spools 22 can be represented with any data structures suitable for queues and buffers, such as for example Apache Kafka.

Figure 8B:
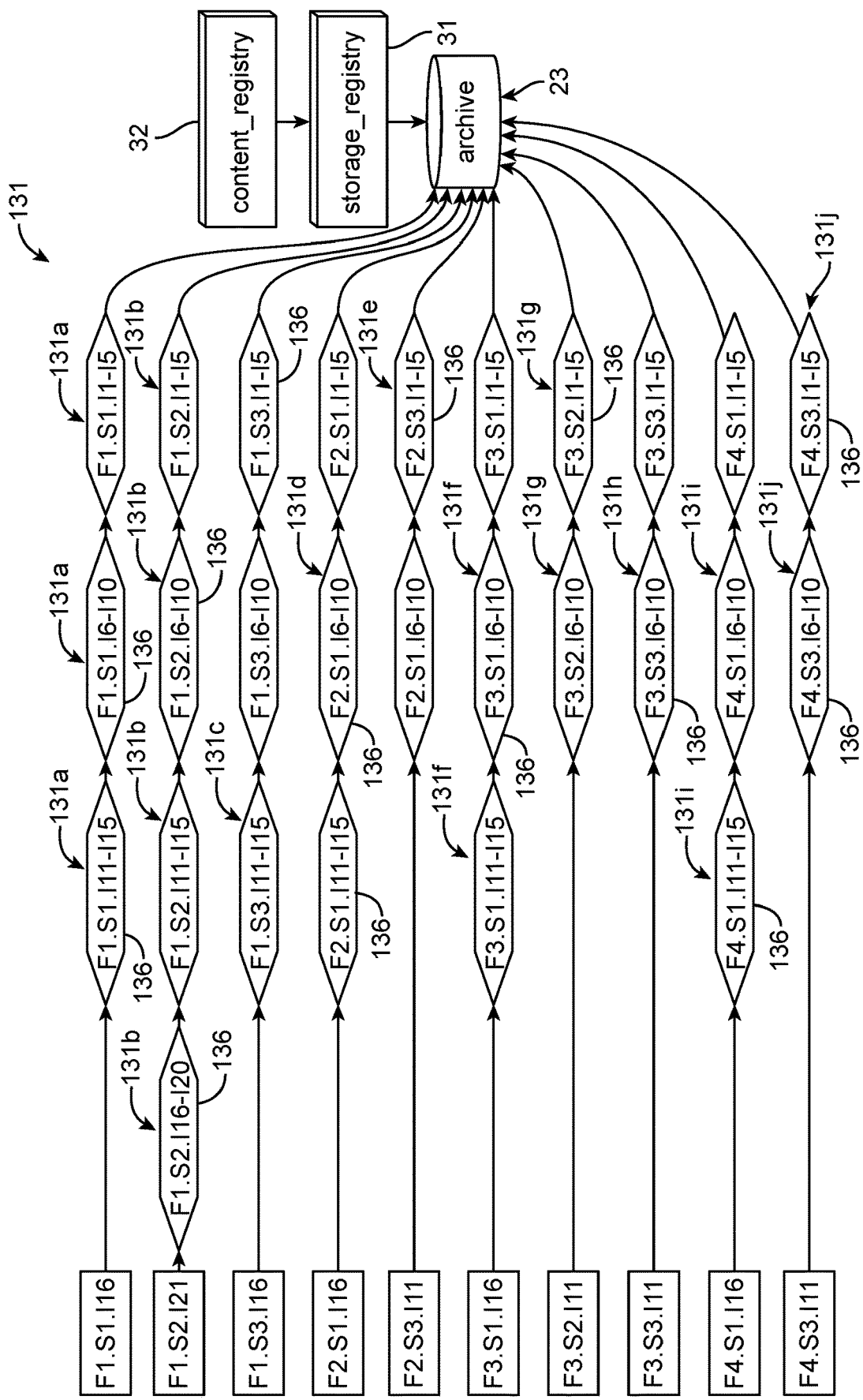
FIG. 8B is a continuation of the schematic illustration of FIG. 8A showing earlier event series that have been formatted for long term storage.

Examples of a plurality of event series that have been separated from source messages, for example source messages 102, from data sources, for example sources 36, and written into one or more spools are shown in the portion of diagram 121 in FIG. 8A. Such event series shown in FIG. 8A are being exported from the one or more spools, for example spools 22, for storage with earlier related event series from the respective source. The plurality of ten event series 122 in FIG. 8A include first through tenth event series 122a-122j. Each event series 122 includes a plurality of events 123, each represented by a field 124 having an event series identifier, represented by a field identifier 127 and a source identifier 128, and an event identifier 129 for the event. The event identifier can optionally be referred to an event index in some cases, for example when the data source is a device. Field identifier 127 can optionally be referred to as an event type identifier 127. Each event 123 has an event index, for example equal to the placement of the event in the series 122 of sequential events 123. Event series 122a, for example, includes three events 123, each with a field identifier 127 of F1 and a source identifier 128 of S1. Each event 123 in series 122a additionally includes a value in the portion of the field 124 labeled with the event identifier 129. The first event, with an optional event index of 16, has a value in the portion of the field 124 labeled with the event identifier 116. The second event, with an optional event index of 17, has a value in the portion of the field 124 labeled with the event identifier 117. The third event, with an optional event index of 18, has a value in the portion of the field labeled with the event identifier 118. Such events 123 of event series 122a are optionally the $16^{th}$, $17^{th}$ and $18^{th}$ events of the event series. Similarly, event series 122b optionally includes the $21^{st}$ through $25^{th}$ events of the event series. Event series 122 are optionally ordered by the field identifier 127, for example with the events 123 in event series 122a to 122c each having a field identifier of F1. The event series relating to a field identifier are optionally ordered by the source identifier, for example each of the events 123 in event series 122a have a source identifier of S1, each of the events in event series 122b have a source identifier of S2 and each of the events in event series 122c have a source identifier of S3. The portion of diagram 121 in FIG. 8A includes earlier event series 131, for example respective earlier event series 131a-131j for event series 122a-122j. Each earlier event series 131 can, for example, include sequential events that occurred earlier than the events 123 of the respective event series 122, and are optionally in long term storage in archives 23 where they are optionally stored in a compact archival format. The portion of diagram 121 in FIG. 8B includes further earlier event series 131, for example further earlier event series 131a-131j. Although the portion of diagram 121 in FIG. 8B shows the event series 122 being exported from one spool 22, it is appreciated, for example as discussed above, that any number of spools 22 can be utilized including one per event series or multiple event series per spool.

The event warehouse of the invention, for example system 21, may further desire to leverage tiered storage for a combination of cost effectiveness and high performance. Tiered storage can optionally consist of two or more tiers of storage where tiers with higher read and write performance and lower latency are generally more expensive. Examples of high performance storage include block or filesystem storage backed by solid state disks or computer memory which may be managed through a service such as Amazon EBS or OpenStack Cinder. Examples of low cost storage include object or archive storage backed by hard disk or tape drives which may be managed, for example, through a service such as Amazon S3 or OpenStack Swift. System 21 may achieve a balance of high performance and cost effectiveness by initially storing event series data on spools backed by higher performance storage, then formatting older segments of those event series into compact forms that may be moved into lower cost storage used for long term archival.

In this regard, managing spools 22 can be an ongoing operation for the software of the invention, for example system 21. Any event series 122 in the spools can accumulate an indefinitely large number of historical events 123 which may be infeasible to store in the spools, often for storage cost or availability reasons. Accordingly, data from an event series 122 may optionally be removed from the spools 122. Rather than simply deleting the data, the software of system 21 can optionally move it to archival storage, for example archives 23 or other long term storage. For example, system 21 can in an optional step move data, event series 122 or portions of event series 122 from spools 122 into other tiers of storage with lower cost and lower performance, therefore leveraging tiered storage to achieve a combination of cost effectiveness and high performance within any given event series 122.

In an optional step, the software of the invention can decide that data from an event series, for example all or a portion of an older event series 122, should move from its one or more spools 33 into long term storage, for example into archives 23. This decision can be a tunable configuration by the system 21 or the user. The software may optionally decide to move data, for example decide to divide the event series 122, once there are enough older events 123 to be compacted efficiently, once a configured deadline or sync interval for the series has passed, or both. Such decision step can optionally be performed by one or more processors 24 of system 21.

To prepare an event series 122 for tiered storage, the software of the invention or system 21 can optionally internally divide the event series 122 into two distinct subseries of events or sub event series, for example a first subseries that includes the most recent events 123 remaining in the spools 22 and a second subseries that includes all other, older events 123 that should be sent to long term storage, for example formatted in a compact format and stored in lower tier archival storage. The software of the invention can decide where to divide any given event series 122 on an ongoing basis, for example as new events 123 are added to the event series, as time passes or both. Diagram 121 of FIG. 8A shows ten event series 122, the most recent event series from respective data sources 36, which may be backed up by higher performance storage tiers, for example spools 22. Events that are older than such event series 122, for example earlier event series 131, may optionally be stored in archives, for example archives 23, which may be backed by lower cost storage tiers.

Before storing data in event series, for example event series 122, in long term storage, the software of the invention can optionally format the data into a compact representation to minimize the required storage space and future storage input and output for data processing. Such storage formatting step can optionally include formatting the event series 122 coming off spools 22 into any suitable compact blob format for tiered storage. Since each event series 122 optionally includes values 129 from a single data source 36 from a single type of event is its fields 124, the event series can be treated as a single column and formatted using any suitable column oriented data format, such as for example Apache Parquet, RCFile, ORC or any other columnar data format. Column-oriented optimization techniques can work well for efficiently storing the data of event series 122, for example by utilizing column-wise compression such as using bitmap indexes, striping and assembly algorithms, compression and encoding targeting specific data types or any combination of the foregoing. Such formatting step can optionally be performed by one or more processors 24 of system 21.

The portion of diagram 121 in FIG. 8B shows compact representations for the ten earlier event series 131 which may be archived in lower cost storage tiers. In this regard, earlier event series 131a, that is for field 1 of data source 1, has three blobs 136 respectively containing the compact data from the 1st-5$^{th}$ events 123, the 6th-10$^{th}$ events 123 and the 11th-15th events 123 in series 131a. The earlier event series 131b, that is for field 1 of data source 2, has four blobs 136 containing the compact data from the 1st-5$^{th}$ events, the 6th-10$^{th}$ events, the 11th-15$^{th}$ events and the 16th-20th events in the series 131b. Events more recent than such earlier event series 131a and 131b in compact representations, that is respective event series 122a and 122b, may be backed by higher performance storage tiers, for example in spools 22.

FIGS. 8A-8B illustrate a software configuration where system 21 has optionally implemented a policy to divide event series such that there are at least five events 123 to be compacted. Note that five is likely a very low number of events and is discussed herein for illustrative purposes only. In a real world system, the number of events 123 would more likely be closer to 5,000,000. For example, the F1.S1 event series 122a in FIG. 8A has its 16th, 17th, and 18th events in its spool 22 while the 1st-15th events 123 in earlier event series 131a are stored in lower tier archival storage. FIG. 8B depicts the 1st-15th events 123 in archival storage, for example archives 23, divided into three blobs 136 each containing five compacted events 123, that is the 11th-15$^{th}$ events 123 in a blob 136, the 6th-10$^{th}$ events in another blob and the 1st-5$^{th}$ events in a further blob. Another example is the F1.S2 event series 122b in FIG. 8B which depicts five events 123 in the spool 22. Since this may be enough events to be compacted according to the foregoing policy, the system 21 is likely about to choose a new division point for this event series and begin the process of formatting the 21st to 25th events in series 122b in preparation for moving them to lower tier archival storage.

Alternatively or in addition to an event count policy as described above, the software of system 21 can divide an event series 122 based on time. One optional strategy can be to format and move all events 123 in a spool 22 on a regular interval. Another strategy can be to optionally support a customer configuration that expresses time boundaries which are meaningful to the customer, such as the end of a business day or fiscal quarter. The software of the invention can respect that configuration by formatting and moving all events in the spool once the system clock or external time source passes that boundary and therefore no more new events are expected for the time interval that has completed.

In an optional step of the software of the invention, event series formatted for long term storage are optionally written into external storage while tracking both low level blobs and semantic level field identifiers, data source identifiers and event index ranges in registry databases. Regardless of the specific format or techniques chosen for formatting the event series, the software of the invention, for example the software of system 21, can optionally treat the formatted event series data as opaque immutable binary large objects, which can optionally be referred to as blobs. The software of system 21 can store these blobs in any suitable external storage mechanism, such as for example object storage with S3 semantics, storage arrays or appliances using protocols such as NFS, SMB/CIFS or iSCSI, local file system storage, remote HTTP/FTP storage, storage with other or custom protocols or any combination of the foregoing. To assist in meeting modern demands of cost effective and elastic scaling, cloud-scale object storage with S3 semantics may be utilized.

For any given blob representing a subset of contiguous events or event index range from an event series, such as any series of events 123 of an event series 122, the software of the invention, for example the software of system 21, may store the blob directly in underlying storage as the same native unit for that storage, for example an object, a file or a block. In instances where the logical blobs being stored may be too large for the physical storage units available, the software may further break up logical blobs into multiple physical chunks that can be stored as the underlying storage's native unit. To recover logical blobs from chunks, the software may maintain a registry, for example storage registry 31, that maps blobs to their physical storage representations. An etcd, HashiCorp Consul, LDAP, RDBMS or any other suitable database may be used as the registry database. Since event series and their blobs are immutable, the software of the invention can optionally use some form of hash, for example SHA-256, of blob contents as logical blob identifiers in order to implement content-addressable storage. To support querying based on semantic identifiers such as a field identifier, a data source identifier or an event index, the software of the invention, for example the software of system 21, can optionally also maintain a registry, for example content registry 32, that maps such identifiers to logical blobs. Optionally, this semantic registry can be conceptually a lookup table to find a blob identifier for a given event series identifier and event index range.

Figure 9:
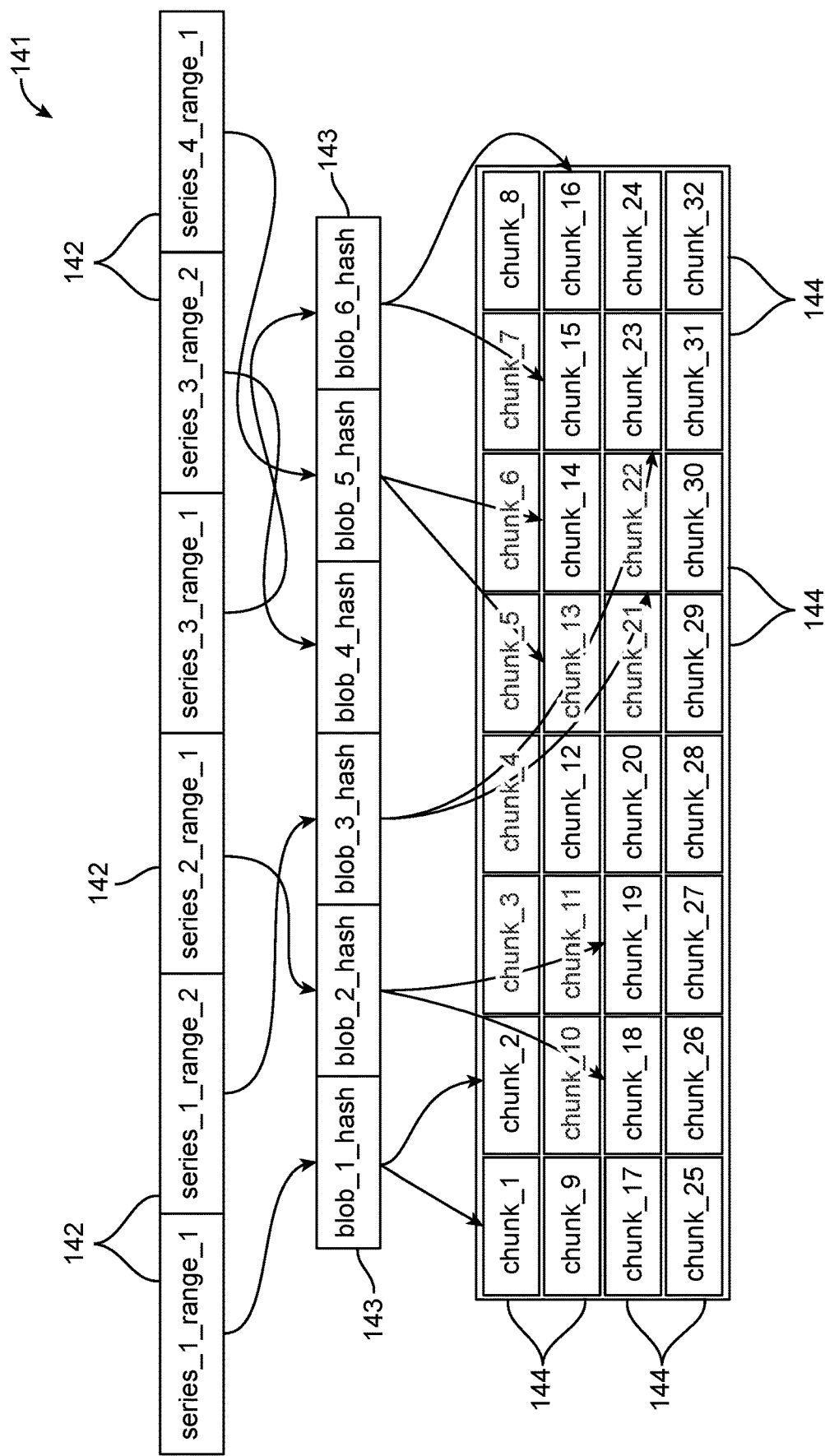
FIG. 9 is a schematic illustration of registries of the event warehouse or system of the invention that tracks data locations to assist in retrieving all or portion of an event series from archival storage.

The diagram 141 of FIG. 9 illustrates an example of both registries together, and includes a plurality of ranges 142 of event series 122, a plurality of content hashes 143 and a plurality of storage chuck 144, for example in archivers 123. In a sample application of diagram 141, to query for the earliest events 123 from an event series 1 in the diagram, the system 21 may look up the range 142 labelled series_1 range_1 in content registry 32 to determine that its content hash 143 is blob_1 hash. The system may then look up blob_1 hash in the storage registry 31 to determine that such content hash is found in the storage chunk 144 labelled chunk_1 and chunk 2. The system may then retrieve chunk_1 and chunk 2 from the underlying archival storage 23, concatenate them together to form the content of blob_1, and unpack the desired data of the event series 122 from blob_1.

In an optional step, the software of the invention can present suitable application programming interfaces (APIs), for example views 26, for data processors or applications of users to access and query the stored data of the invention. For example, the software of the invention can present APIs for external consumers such as data processors for analytics and auditing to access the data of event series stored in the event warehouse or system of the invention, for example system 21. The API implementations of the software can use the registries of the system, for example registries 31, 32, to translate requests for semantic event identifiers into the external storage requests that retrieve the desired data. In this regard, a semantic address identifier can be treated as a Universal Resource Identifier (URI) representing a coordinate in this space, for example field×data source×event index. As discussed above, the field identifier, for example field identifier 106, and data source identifier, for example source identifier 107, taken together may be referred to as an event series identifier, which is one dimension in the semantic registry. The software of system 21 can determine one or more appropriate event index ranges to make complete queries to the semantic registry through its other dimension. For example, to fulfill a request for a single event, for example an event 123, the software can choose the index range that contains the requested event index. To fulfill a request for a range of events from a single event series, for example a range of events 123 from a single even event series 122, the software can choose index ranges that include all of the event indexes in the requested index range. To fulfill a request for all events from a single event series, the software can choose all index ranges for that series. To fulfill requests involving multiple event series, for example multiple event series 122, the software can perform the above steps for each requested event series.

Immutability is a design goal for the event warehouse of the invention because analytics and auditing use cases typically operate on historical data which should already have been committed by the OLTP or other operational systems, and modifying historical data can yield inconsistent and confusing results from computations. In practice, data sources or middleware may malfunction and cause errata in the otherwise immutable data being sent, and this can be challenging for strictly immutable systems to reconcile. Since the event warehouse or system of the invention maintains both a strictly immutable content-addressable storage registry and a mostly immutable semantic address registry, the event warehouse or system of the invention can account for errata from data sources. Use cases which are sensitive to such errata can detect and handle inconsistencies by observing that the semantic address does not always resolve to the same immutable content address.

The event warehouse or system of the invention, for example system 21, can deal with big data: petabytes and more. Efficient processing and utilizing as many parallel resources, for example storage bandwidth and compute cycles, as possible can be very desirable for ETL or ELT to complete on time. In some instances, for example when a data source is constantly sending events, it may be desirable that processing a transformation for a given event series not require retrieving data from other event series so the relevant data can be retrieved as quickly as the, often single-threaded, computation can request it. The event warehouse or system of the invention can achieve this by treating every field, source pair as a separate event series with nothing else commingled in their storage format. To process multiple event series efficiently, parallel resources, especially elastic cloud resources, can be leveraged.

Figure 10:
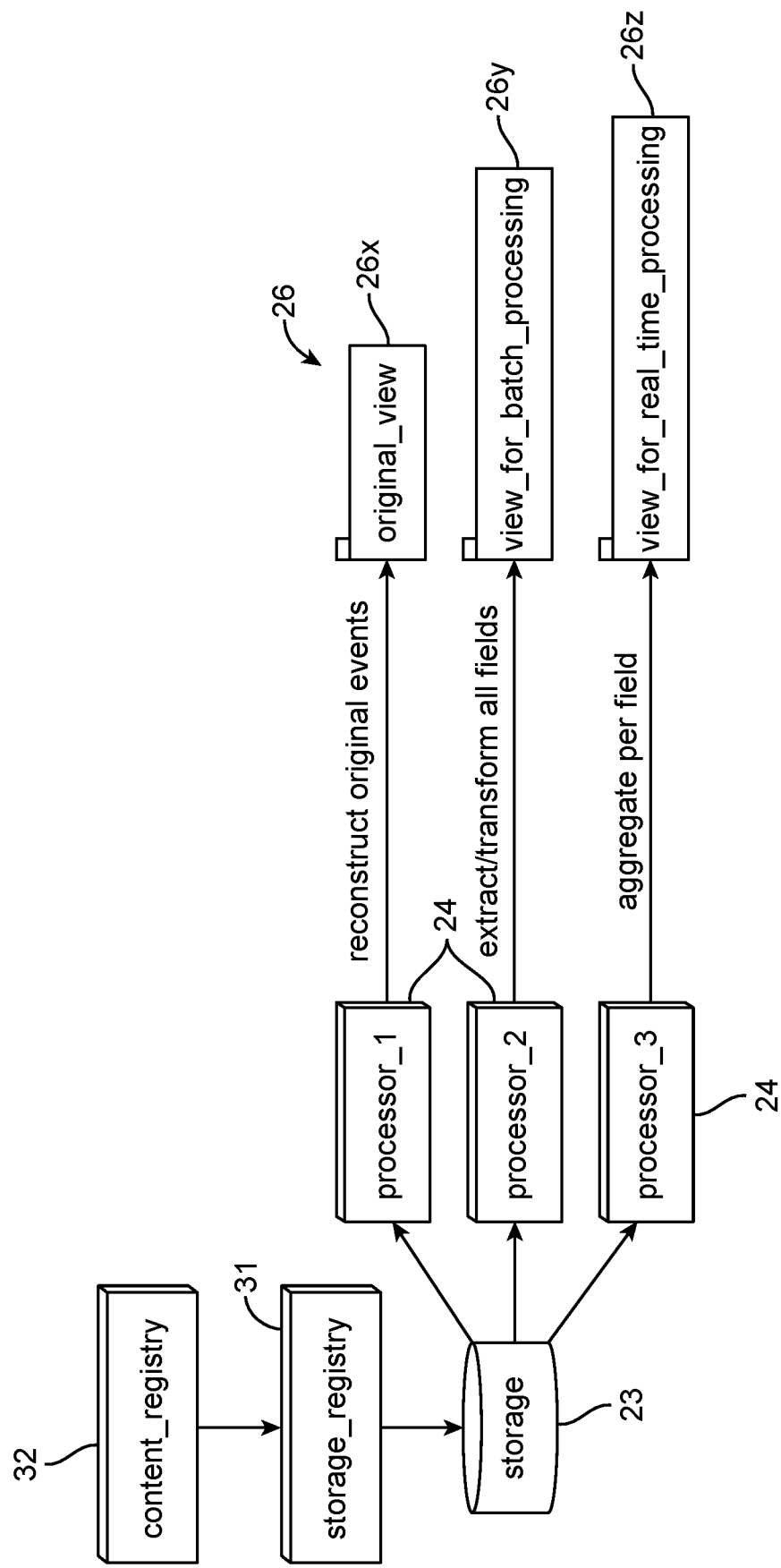
FIG. 10 is a schematic illustration of different views of event data that can be reconstructed by processors from long term storage of the event warehouse or system of the invention.

Many applications of users utilizing the event warehouse or system of the invention, for example system 21, may prefer at least one basic view of their event data, for example in the same structure that the data sources 36 of the application sent the source data. The canonical format that can be used in the event warehouse or system's long term storage can optionally separate all fields and data sources into independent event series. To reconstruct the original structure with potentially commingled fields and data sources, the event warehouse or system of the invention, for example system 21, can correlate events from multiple series by matching event identifiers. The format of event identifiers can depend on the application but can often be either a unique timestamp, index in a contiguous sequence, or an application transaction identifier. With the relevant events from multiple series identified, processing for reconstruction can optionally output composite events with multiple values grouped together. In this manner, an original view, for example view 26x in FIG. 10, can optionally be reconstructed by system 21 from event data in long term storage of system, for example archives 23.

Traditional OLAP uses batch processing to transform original data into a snowflake or star schema, denormalizing the data into central fact tables referenced by dimension tables. The event warehouse or system of the invention, for example system 21, can support an analogous operation with part of the denormalization already completed during the spooling phase, which can be referred to as the separating step, that separated different fields and data sources into their own event series, for example event series 122. To create a view with a similar snowflake schema, the event warehouse or system 21 can run highly parallel batch processes to retrieve data from all event series, generate equivalent fact tables from them, and correlate matching event identifiers to generate equivalent dimension tables referencing facts. Such a view can then be used as input into any batch analytics application, such as for example the Apache Hadoop and Apache Spark ecosystems or cloud warehouses such as for example Snowflake, Google's BigQuery, and Amazon Redshift. In this manner, a view created for batch processing, for example view 26y in FIG. 10, can optionally be reconstructed by system 21 from event data in long term storage of system, for example archives 23.

Applications, for example of users, increasingly prefer for their analytics queries to be updated in real time to support live monitoring, or dashboards, and the capability for users or applications to react to live feedback from the system. IoT applications particularly benefit from being able to take actions affecting the physical world according to current data, including in deployments where networking constraints prevent batch processing from completing on time. Since the event warehouse of the invention, for example system 21, can be centered around streaming events, for example event series, and can optionally use a strategic data layout to support highly parallel and efficient transformation processing that can catch up to data sources, its views, for example views 26, can be maintained in real time with minimal update latency as data sources 36 generate source messages, for example source messages 102, with new events. These views can be consumed by other applications as well as the initial application handling the original event series, for example event series 122. In this manner, a view created for real time processing, for example view 26z in FIG. 10, can optionally be reconstructed by system 21 utilizing event data in long term storage of system, for example archives 23.

It is appreciated that an event warehouse or system of the invention, for example system 21, can optionally include less than all, portions or only some of the foregoing steps. In addition, the steps of the invention may optionally be performed in a different order than disclosed herein. Additional steps can optionally be provided.

By using immutable series of events as its canonical data representation, an event or data warehouse of the invention, with appropriate tools and frameworks, can enable software organizations to either start with a more future-proof event sourcing architecture from the beginning or help to migrate legacy applications towards a more capable architecture. The event warehouse or system of the invention is beneficial in many other respects.

One significant advantage with an event warehouse or system of the invention, for example system 21, enabling CQRS is that application database schemas can advantageously become easier to change or correct even after they have already entered production. Schema and data migrations are traditionally a risky and expensive operation that organizations often prefer to minimize by designing their initial schemas carefully. Nonetheless, some organizations are not careful, especially under time constraints, and deploy production schemas that are functional in the short term but become expensive or create difficult problems in the long term, such as for example not supporting the type of analytical queries that are desirable later in the product life cycle. The idea of CQRS is to support different schemas for adding or updating data and for querying or analyzing data.

An event warehouse or system of the invention, for example system 21, can advantageously support retroactive schema changes with ingest connectors and view transformations targeted to the transaction logs of application databases such as an RDBMS. During ingestion, the database transaction logs of the system can be interpreted as one or more event series where rows and/or tables are the data sources. With those event series, for example event series 122, stored in the event warehouse or system 21, transformations can optionally compute the accumulated effects on those rows and/or tables, for example to determine a resulting state of a data source, using the same techniques that database recovery solutions use to replay transaction logs. Such transformations can replay such accumulation transactions into a new view of the tables with either the original schema or a newly chosen schema, particularly for analytics. Since the event warehouse or system, for example system 21, can optionally maximize both the single-thread efficiency and the parallelism of such accumulation transformations to eventually converge and maintain a live alternative view of the event series data while it is being updated in production, such live view could be used as an alternate schema to more easily migrate production workloads.

The event warehouse or system of the invention, for example system 21, can advantageously store immutable data with completely stable blob content identifiers and highly stable, unique event semantic identifiers. Such architecture can lend itself very well to various decentralized, distributed, or federated deployments that involve multiple event warehouses or systems 21. Each system 21 can be capable of acting autonomously to ingest events, store its event data, and process the event data into views, for example views 26, for local applications to consume. Each system 21 can also replicate content between each other system 21 without risk of corruption or inconsistency because all of the content is immutable and the identifiers are unique and stable enough to avoid collisions. Such replication strategies are very flexible in their scheduling and the amount of data they replicate because it is fully optional, and local operations are typically unaffected if replication does not occur.

The event warehouse or system of the invention can advantageously store event series, for example event series 122, as content-addressable immutable blobs, for example blobs 136. Such a storage subsystem can be very general purpose, and it can be natural to leverage this subsystem to store other types of content that would otherwise require a separate storage solution. For example, if a source, for example data source 36, is sending video content as part of its events, such as for example a video surveillance application, the video itself or each frame can optionally be stored as its own blob. The content identifier for the blob, which can optionally be based on a hash such as SHA-256, can be referenced within events 123, the storage registries 31, or even external applications instead of storing or transmitting redundant copies everywhere the content is used.

Several use cases of the event warehouse or system of the invention, for example system 21, will now be described. In one such use, an application can be designed to use event warehouses or systems of the invention, for example system 21, from the beginning. Application developers could optionally design their schemas in terms of events, for example events 123, instead of states resulting from the effects of those events. A transactional database in front of the system 21 may not be necessary if the application has no requirements for transaction semantics. At a time of their choosing, application developers could optionally configure one or more views, for example views 26, to be maintained live in the system w1 to enable the types of queries or analytics desired for their application, and could then implement code in their application servers to make those queries directly. A particularly common type of view would be the accumulation of effects from events series, or example event series 122, into stateful results, for example resulting states 93, to support the same functionality that would traditionally have involved a mutable datastore such as an RDBMS. IoT applications are suitable examples because they are already oriented around end devices streaming data such as sensor readings that can be considered as events.

An application can be designed to use primarily a mutable database for OLTP, and use or plan to use traditional ETL to support OLAP with event warehouses or systems of the invention, for example system 21. These applications could optionally use one or more likely prebuilt connectors that ingest transaction logs from mutable databases as event series, for example event series 122, in the system 21. They could then use some combination of generic and custom-built transformers to configure views, for example views 26, to support analytics, auditing, or other types of queries. Unlike with traditional data warehouses, it can be easy and efficient to create views that involve the history or time series analysis of the data because the system 21 can contain full transaction logs from the OLTP database and can process them efficiently.

With any use case, the event warehouse or system of the invention, for example system 21, can support the application operators of the system by providing observability. Since full logs of either native events or database transactions can be available in system 21, and the system 21 can efficiently maintain multiple different views of the data, the application operators can configure their own views, for example views 26, to suit their purposes, independently of application developers. Such views can facilitate tasks such as searching for or tracing all events, for example events 123, involving a particular identifier, computing aggregate statistics for monitoring and dashboards, and triggering alerts for certain types of events that could indicate a problem.

The event warehouse or system of the invention, for example system 21, can optionally serve as an ad hoc backup and recovery mechanism. Since the data from system 21 can be immutable and includes full history, generating a view, for example a view 26, with the accumulated effects, such as database transactions, can be a step towards using that view to recover from data loss in the original system. The immutable data is typically safe and can be easy to replicate into other event warehouses or systems 21 for additional copies to use for off-site recovery.

In some aspects of the invention, a method for organizing data by events is provided and can include obtaining a series of data messages from a data source, at least some of the messages having an event of a first type and at least some of the messages having an event of a second type, separating the events of the first type from the series of data messages and organizing the events of the first type into a first series of event data and separating the events of the second type from the series of messages and organizing the events of the second type into a second series of event data.

The data source can optionally be selected from the group consisting of interne of thing devices, smart home devices, wearable technology, microcontrollers with sensors, embedded microcomputers, smartphones, tablets, personal computers, mobile devices and any combination of the foregoing. Each event of the first type and each event of the second type can optionally be selected from the group consisting of a timestamp, a temperature, a humidity, a pressure, a power, a movement, a motion, an acceleration, a light reading, a sound reading, a coordinate, a transaction, an occurrence, a status, a sequence and any combination of the foregoing. The method can optionally further include associating a first field identifier with the first series of event data and associating a second field identifier with the second series of event data. The method can optionally further include parsing the series of data messages to obtain the first field identifier. The data source can optionally have a data source identifier, and the method can optionally further include associating the data source identifier with the first series of event data and the second series of event data. The method can optionally further include assigning the first series of event data an event series identifier as a function of the first field identifier with the data source identifier. Each message can optionally have an event of the first type that has a first distinct value associated with the respective event and each message of the second type can optionally have a second distinct value associated with the respective event and the first series of event data can optionally include the first distinct value for each respective event and the second series of event data can optionally include the second distinct value for each respective event. The method can optionally further include accumulating the first distinct value of each respective event of the first type to derive a first state of the data source after the occurrence of each event of the first type. The method can optionally further include assigning each event of the first type in the first series of event data with an event index corresponding to the order of the event in the first series of event data. The method can optionally further include formatting the first series of event data into a first compact blob format and formatting the second series of event data into a second compact blob format for tiered storage.

In some aspects of the invention, a method for determining a state of a data source can be provided that includes obtaining a stream of sequential event data from the data source corresponding with a sequence of events of the data source, storing the stream of event data in archival storage, retrieving the stream of event data from archival storage at a later time when the state of the data source is needed and accumulating the event data in the stream to determine the state of the data source after the occurrence of the sequence of events.

The stream of sequential data can optionally all correspond to a single type of event of the data source. The obtaining step can optionally include parsing the stream of sequential event data from a series of messages from the data source. The method series of messages can optionally include additional sequential data from a different type of event of the data source.

In some aspects of the invention, a method for managing event data from a data source can be provided that includes obtaining a plurality of streams of event data from the data source, storing the plurality of streams of event data in temporary storage of a computer system, choosing to store at least one of the plurality of steams of event data in archival storage as a function of performance parameters of the system and retrieving the at least one of the plurality of streams of event data from temporary storage and writing it into archival storage of the system.

Each of the plurality of the streams of sequential data can optionally correspond to a single type of event of the data source. The performance parameters of the system can optionally be selected from the group consisting of a sufficient number of streams of event data to compact efficiently for archival storage, passage of a configured deadline, passage of a sync interval and any combination of the foregoing. The writing step can optionally include formatting the at least one of the plurality of streams of event data into a compact blob format for tiered storage. The method can further include accumulating a stream of event data in temporary storage to derive a state of the data source.

We claim:

1. A computer-implemented method of a computer system to organize data by events, the method comprising: the computer system obtaining a series of data messages from a data source having a data source identifier, each of the messages having at least one field, at least some of the messages having an event of a first type in the at least one field and at least some of the messages having an event of a second type in the at least one field, the computer system separating the events of the first type from the respective at least one field of the series of data messages and organizing the events of the first type into a first series of event data for storing in the computer system and separating the events of the second type from the respective at least one field of the series of data messages and organizing the events of the second type into a second series of event data for storing in the computer system, the computer system associating the data source identifier and a first field identifier with the first series of event data and associating the data source identifier and a second field identifier with the second series of event data, the computer system assigning the first series of event data an event series identifier as a function of the first field identifier and the data source identifier, whereby the separating and organizing steps reduce the amount of data that needs to be retrieved from storage when transforming the retrieved data into a view of the data source.

2. The method of claim 1, wherein the data source is selected from the group consisting of internet of thing devices, smart home devices, wearable technology, microcontrollers with sensors, embedded microcomputers, smartphones, tablets, personal computers, mobile devices and any combination of the foregoing.

3. The method of claim 1, wherein each event of the first type and each event of the second type is selected from the group consisting of a timestamp, a temperature, a humidity, a pressure, a power, a movement, a motion, an acceleration, a light reading, a sound reading, a coordinate, a transaction, an occurrence, a status, a sequence and any combination of the foregoing.

4. The method of claim 1, further comprising the computer system parsing the series of data messages to obtain the first field identifier.

5. The method of claim 1, further comprising the computer system assigning the second series of event data an event series identifier as a function of the second field identifier and the data source identifier.

6. The method of claim 1, wherein each message having an event of the first type has a first distinct value associated with the respective event and each message having an event of the second type has a second distinct value associated with the respective event and wherein the first series of event data includes the first distinct value for each respective event and wherein the second series of event data includes the second distinct value for each respective event.

7. The method of claim 6, further comprising the computer system accumulating the first distinct value of each respective event of the first type to derive a first state of the data source after the occurrence of each event of the first type.

8. The method of claim 1, further comprising the computer system assigning each event of the first type in the first series of event data with an event index corresponding to the order of the event in the first series of event data.

9. The method of claim 1, further comprising the computer system formatting the first series of event data into a first compact blob format and formatting the second series of event data into a second compact blob format for tiered storage.

10. A method for a computer system to organize data by events, comprising: the computer system obtaining a series of data messages from a data source, each of the messages having at least one field, at least some of the messages having an event of a first type in the at least one field and at least some of the messages having an event of a second type in the at least one field, each message with an event of the first type having a first distinct value associated with the respective event and each message with an event of the second type having a second distinct value associated with the respective event, the computer system separating the events of the first type from the respective at least one field of the series of data messages and organizing the events of the first type into a first series of event data including the first distinct value for each respective event for storing in the computer system and separating the events of the second type from the respective at least one field of the series of data messages and organizing the events of the second type into a second series of event data including the second distinct value for each respective event for storing in the computer system, the computer system accumulating the first distinct value of each respective event of the first type in the first series of event data to derive a state of the data source after the occurrence of each event of the first type, whereby the separating and organizing steps reduce the amount of data that needs to be retrieved from storage and enable the use of highly optimized stream processors when deriving the state of the data source.

11. The method of claim 10, wherein the data source is selected from the group consisting of internet of thing devices, smart home devices, wearable technology, microcontrollers with sensors, embedded microcomputers, smartphones, tablets, personal computers, mobile devices and any combination of the foregoing.

12. The method of claim 10, wherein each event of the first type and each event of the second type is selected from the group consisting of a timestamp, a temperature, a humidity, a pressure, a power, a movement, a motion, an acceleration, a light reading, a sound reading, a coordinate, a transaction, an occurrence, a status, a sequence and any combination of the foregoing.

\* \* \* \* \*